United States Patent [19]

Fernandes et al.

[11] 4,410,198
[45] Oct. 18, 1983

[54] HUMAN POWERED VEHICLE

[75] Inventors: Fred D. Fernandes, La Verne; John M. Speicher, Upland; Douglas W. Unkrey; Allan A. Voigt, both of Anaheim, all of Calif.

[73] Assignee: Versatron Research Corporation, Geyserville, Calif.

[21] Appl. No.: 258,941

[22] Filed: Apr. 30, 1981

[51] Int. Cl.³ .................................. B62K 5/02
[52] U.S. Cl. .................... 280/281 LP; 280/231; 280/267; 280/281 B; 296/1 S
[58] Field of Search ............... 180/210, 217, 903; 280/152.1, 152.2, 153, 153 R, 153 A, 220, 222, 224, 231, 232, 267, 280, 281 B, 281 LP, 282, 289 S, 281 R, 252; 296/15, 78 J, 205

[56] References Cited

U.S. PATENT DOCUMENTS

| 1,135,337 | 4/1915 | Bunau-Varilla | 296/78.1 |
| 1,585,832 | 5/1926 | Doud | 280/267 |
| 1,648,505 | 11/1927 | Persu | 296/1 S |
| 2,177,793 | 10/1939 | Taylor | 280/220 |
| 4,049,309 | 9/1977 | Seal | 296/1 S |
| 4,326,728 | 4/1972 | Tatch | 280/289 S |

FOREIGN PATENT DOCUMENTS 499199 6/1930 Fed. Rep. of Germany ...... 296/1 S
2922691 12/1980 Fed. Rep. of Germany ...... 280/267

OTHER PUBLICATIONS

Barney Cohen, "Whizzz! Swoosh! It's Future Bike!" *Readers Digest*, Feb. 1981, pp. 187-194.

*Primary Examiner*—David M. Mitchell
*Assistant Examiner*—Pierre Huggins
*Attorney, Agent, or Firm*—Henry M. Bissell

[57] ABSTRACT

A human powered vehicle of the pedal-driven type having three or more wheels, a frame and seat for supporting one or more riders in a generally supine position, and a streamlined shell enclosure with a transparent canopy which is openable for entry and egress of the rider. The preferred embodiment for a single rider has two steerable wheels located forward of the rider at approximately the widest part of the streamlined shell, and a single fixed drive wheel centrally positioned behind the rider. The drive wheel is equipped with a multi-sprocket gearing arrangement, and a large pedal-equipped sprocket wheel is mounted in a position slightly forward and above the common axis of the front wheels for ready engagement by the rider's feet. A single drive chain extends from the drive sprocket to the sprocket cluster and passes around idler rollers which direct the chain beneath the rider.

37 Claims, 11 Drawing Figures

HUMAN POWERED VEHICLE

BACKGROUND OF THE INVENTION

1. Field of the Invention

This invention relates to human powered or pedal-type vehicles, such as bicycles or tricycles, and more particularly relates to such vehicles having a streamlined shell for reducing wind resistance and improving performance.

2. Description of the Prior Art

Conventional fixed-gear bicycles have been in existence since around the turn of the century. During that time the basic design has changed very little. The only significant improvements have been in the chain/gearing system. The most successful of these improvements has been the now-familiar derailleur gear-changing system. Other improvements include the coaster brake, the multi-ratio planetary hubs, and the elliptical front sprocket. All of these drive train improvements have added to the roadability and cruising capability of the bicycle, culminating in the now conventional multi-geared (typically ten-speed) bike which is an elegant design having a drive mechanism perfected to nearly 95% efficiency.

Because the basic power source of a human powered vehicle is limited, the speed such a vehicle can obtain is a function of the total drag presented at different speeds. The higher the total drag characteristics of the man/machine combination, the more limited the speed.

Total drag on any rolling vehicle is equal to rolling wheel drag plus aero drag. Despite its sophistication in mechanical design, the present conventional design and development have not addressed the problem of aero drag. At best, the conventional bicycle provides a layout of frame, seat and handle bars which calls for the rider to assume a rather severely humped-over position. While this reduces drag to a slight extent, it is also quite uncomfortable and is acceptable only to racers and the more serious cycling afficionados.

With the current trend of increasing scarcity and cost of fuels for vehicle propulsion, it becomes appropriate to seriously consider the feasibility of human powered vehicles as commuting vehicles. However, despite the clear need for such use of human powered vehicles, the commuter field has scarcely been penetrated. While bicycles are more popular now than ever before, they are still used mainly for recreation and exercise. Only a few of the more serious bicycling enthusiasts use such vehicles for commuting to and from work, and then only for short distances of ten miles or less. There is a real need for a breakthrough which will render human powered vehicles more attractive and feasible as commuter vehicles.

The conventional unstreamlined bicycle has a fairly large aerodynamic frontal area and a high drag coefficient. The drag due to wind resistance increases nonlinearly with speed and becomes a substantial limiting factor for the expenditure of less than extreme effort at speeds above 15 or 20 mph. There have been a number of efforts at trying to reduce bicycle/rider wind resistance in order to reduce the effort required to develop better vehicle speeds. Some of the resulting arrangements involve adding a streamlined shell to a bicycle, which has the effect of reducing stability and making the vehicle actually dangerous in cross winds of any noticeable magnitude. Other developments have produced three-wheeled streamlined vehicles in which the rider pedals lying on his stomach with his head forward, a relatively uncomfortable and unsafe arrangement. A suitable combination of rider position, propulsion and wheel arrangement with improved streamlining is needed before a truly acceptable human powered commuter vehicle is realized.

SUMMARY OF THE INVENTION

The present invention is characterized in the accompanying Abstract, incorporated herein by reference. In brief, a basic arrangement in accordance with the present invention is a fully streamlined tricycle having the rider in a supine position. The vehicle includes a fixed rear drive wheel, two steerable front wheels, a set of foot cranks mounted on a drive sprocket for rotational engagement by the rider's feet, a multi-sprocket drive cluster affixed to the rear wheel and linked by a chain to the front sprocket, a mechanism such as a derailleur for shifting the chain to different sprockets in the cluster, freewheeling rollers which direct the chain beneath the rider, a braking mechanism, and a streamlined shell with an openable transparent canopy for providing entry and egress to the vehicle. The rider sits leaning back, facing forward with his feet extending forward. The rider steers and controls functions such as braking and gear shifting with his hands.

The position of the rider with feet forward and head nearly erect is more comfortable than a stomach-down position and is much safer in a collision than a head-forward position. In addition, the rider can exert greater pedalling force than is possible in the position used with a conventional bicycle. This position also affords the rider excellent visibility to the front and sides. Mirrors can be placed on the inside of the transparent canopy to provide excellent visibility to the rear.

The power train is relatively simple and uses available bicycle components, such as cranks, sprockets, shifters and chain. The three-wheeled arrangement provides considerably more stability than is possible with a bicycle, particularly with a bicycle which is equipped with a streamlined shell. In addition, the placement of the rider on the underslung frame at or below the wheel axles greatly lowers the center of gravity.

The aerodynamic design of the streamlined shell dictates that the fairing is widest at a point approximately 30 to 60% of the total length back from the nose. The placement of the two front wheels at this point advantageously develops the optimum compromise of maximum stability with minimal drag. The forward part of the body can be characterized as bullet shaped with a drooped nose. The sides and top of the shell are gently rounded in continuous curvature at their respective junctures. Aft of the widest part of the body, the shell is smoothly tapered to a vertical blade-shaped edge at the rear. The location of the single rear wheel just forward of this rear edge also accords with the compromise of stability and streamlining. The result is a superior combination of vehicle structure—running gear, drive train, rider position, etc.—with a streamlined shell enclosure which develops improvements in vehicle stability, rider comfort and safety, pedalling effort, aerodynamic drag, and other features which are important to the realization of a satisfactory human-powered commuter vehicle. This improved combination also achieves the capability of higher top speeds, superior to those of vehicles designed by others in attempts to solve the common problem. Preferred embodiments in accordance with the present invention presently hold world speed records for vehicles of this type, having set records in excess of 55 mph for a single-rider vehicle, in excess of 60 mph for a two-rider vehicle, and an average speed of better than 50 mph for a distance of 41 miles in a two-rider vehicle.

The sides and top of the shell constitute a symmetrical low-drag airfoil. The bottom of the shell enclosure includes a central flat section which is curved and faired to meet the side portions. The shell totally encloses the tricycle structure except for slots in the bottom through which the lower portions of the wheels extend. With a rider placed in such a vehicle, the machine/rider combination has a center of gravity so positioned that all three wheels have approximately equal loading, thus adding to stability and optimum tire wear.

Standard state-of-the art low-drag airfoils are able to maintain laminar fluid flow up to the widest point of their shape. However, if there is any disturbance of the smooth shape of the vehicle's nose, this laminar flow will be lost, and an increase in drag will result. A preferred embodiment of the present invention has no wheels or other disturbing protrusions in the body until nearly the widest point, the place at which the flow is expected to transition naturally from laminar to turbulent flow. Thus, the low drag achieved by this design more closely approaches theoretical low limits. Moreover, the underflow body with curved, faired side edges allows more ground clearance than a straight-sided design of the prior art which extends virtually to the ground in an effort to reduce drag. The present body shape increases roadability without the drag increase associated with a straight-sided design having reasonable road clearance.

In alternative arrangements of the present invention, the shell may be stretched aft of the single rider position with the essential duplication in front-to-back juxtaposition of the frame, seat and drive sprocket to accommodate a second rider. In this configuration, the riders are seated essentially back-to-back, and the first rider's drive sprocket is coupled via a first drive chain and a second sprocket mounted on the second rider's pedal shaft to a common drive sprocket also mounted on that shaft. The common drive sprocket in turn drives the variable speed gear cluster mounted on the rear wheel. The first chain traverses a figure 8 configuration while the second chain is threaded through a direction reversing mechanism so that both riders can pedal in conventional fashion to drive the rear wheel in the forward direction.

In another alternative arrangement, a pair of rear wheels, located side by side, is provided for added stability. These two rear wheels are closer together than the front wheels in accordance with the streamlined shape of the shell. Other drive arrangements may be utilized, such as hand-powered or linear drives, for example. A small internal combustion engine may be added, as in powered hang gliders, for higher performance without unduly increasing the weight.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

Figure 1:
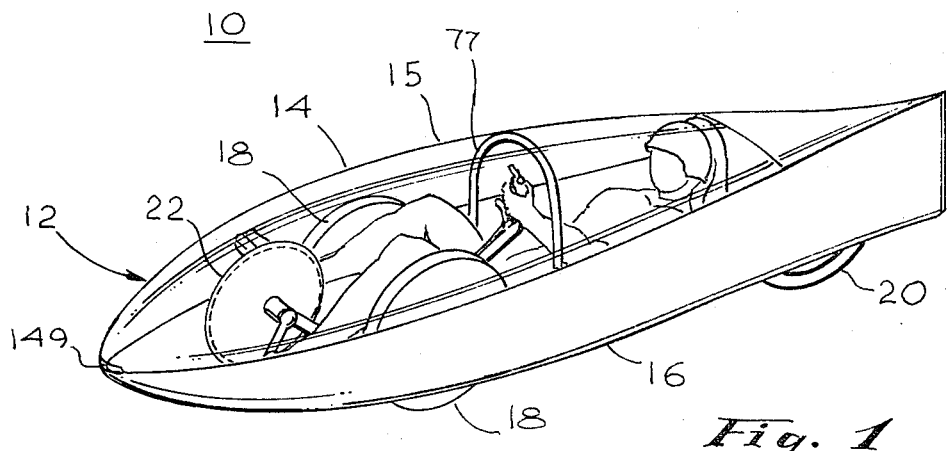
FIG. 1 is a perspective view of one particular arrangement in accordance with the invention.
Figure 2:
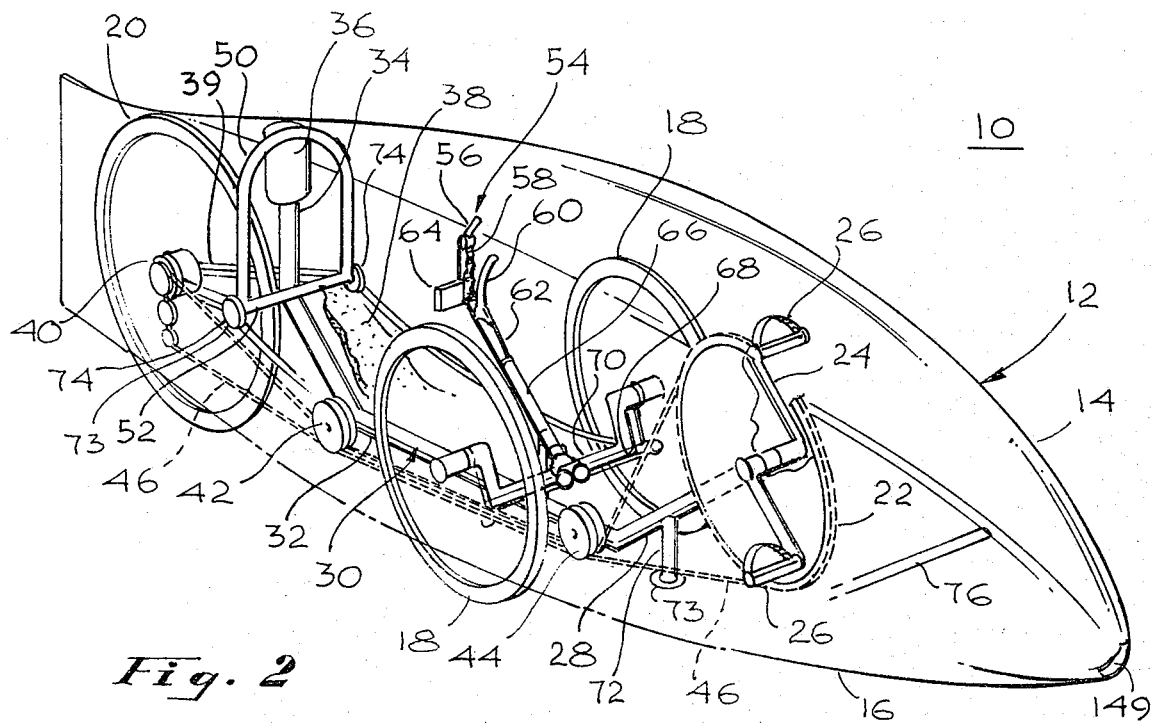
FIG. 2 is another perspective view of the arrangement of FIG. 1, drawn so as to show the internal structure.

As particularly shown in FIGS. 1 and 2 illustrating one preferred embodiment of the invention, a single rider vehicle 10 comprises a streamlined shell 12 having a removable, transparent canopy portion 15 mounted on a body portion 16. The upper forward part of the body 16 is a transparent shell 14 which is adhered to the lower part of the body 16 and shaped in accordance with the aerodynamic design of the overall shell. The vehicle running gear comprises a pair of front wheels 18 and a single rear wheel 20. The vehicle drive train comprises a drive sprocket 22 bearing a pair of pedal cranks 24 to which pedals 26 are affixed and mounted forward of the front wheels on the cantilevered forward portion 28 of a unitary, longitudinal tubular frame member 30. The frame member 30 is underslung along its central portion 32 and is curved upwardly at a rear portion 34 which supports a padded headrest 36. A foam-padded reclining seat 38, shown partially broken away in FIG. 2, is mounted on the frame 30 to support the rider in a supine position. The drive train further comprises a gear cluster 40 mounted on the hub of the rear wheel 20. The gear cluster 40 provides a six-speed transmission system of the derailleur type. Respective pairs of idler pulleys 42 and 44 serve to guide the drive chain 46 along the frame underneath the seat between the drive sprocket 22 and the gear cluster 40. For rider protection, a roll bar in the form of an inverted U-shaped member 50 is attached to the frame by a cross member 52 and mounted adjacent the headrest 36. The rear wheel is mounted by means of fork members 39 to points of attachment on the frame 30.

Control of the vehicle is effected by means of a "joy stick" 54 which is held by the rider while driving. This joy stick incorporates steering, braking and gear shifting controls and has mounted thereon a toggle-type gear shift lever 56, a hand grip 58 and a hand brake lever 60. The brake lever 60 is coupled by conventional cable means 62 to conventional caliper-type rim brakes (not shown) which may be mounted on the rear wheel, the front wheels, or on all three wheels if considered necessary. Hub brakes may be provided, if desired. An instrument cluster 64 is also shown mounted near the joy stick 54 and may include a speedometer and other instruments as desired with, in these days of microprocessors, a route computer. The joy stick column 66 is mounted to the frame 30 to permit rotation about its axis, and steering is effected by rotating the joy stick 54 about the frame axis, thus pivoting the steering rods 68 which extend from each front wheel 18 and are coupled by ball joints to a steering arm (not shown) attached at the base of the column 66. The front axle 70 is underslung to accommodate the rider position and its attachment to the frane 30, and extends upwardly at its outer extremities to the hubs of the front wheels 18.

The outer ends of the rear cross member 52 and a downwardly depending support rod 72 provide a 3-point mounting arrangement to support the lower shell portion 16 from the frame 30. Resilient mounting pads 73 of soft rubber or the like material serve to absorb road vibration transmitted by the frame and isolate the shell therefrom. This serves to prevent vibration of the shell which would interfere with free air flow along the shell and is particularly effective at the forward support rod 72, which is ahead of the point where air flow transitions naturally from laminar to turbulent. This mounting is readily releasable by removable pins (not shown) so that the shell and the internal structure can be easily separated, when desired, as for effecting repairs to the wheels, tires, running gear, etc. The unbreakable plastic canopy 15 is set in place and may be latched by a pair of latches 74 at the sides near the rider position. One or more stiffeners or cross braces 76, 77 may be provided for the body 16 and to support the upper portion 14. The canopy 15 may be removed, for operation as a roadster if desired, and stowed inside the vehicle. The canopy position is aft of the point at which turbulence develops naturally from the aerodynamic shape, so the open cockpit develops less drag than would a similar opening located farther forward.

Figure 3:
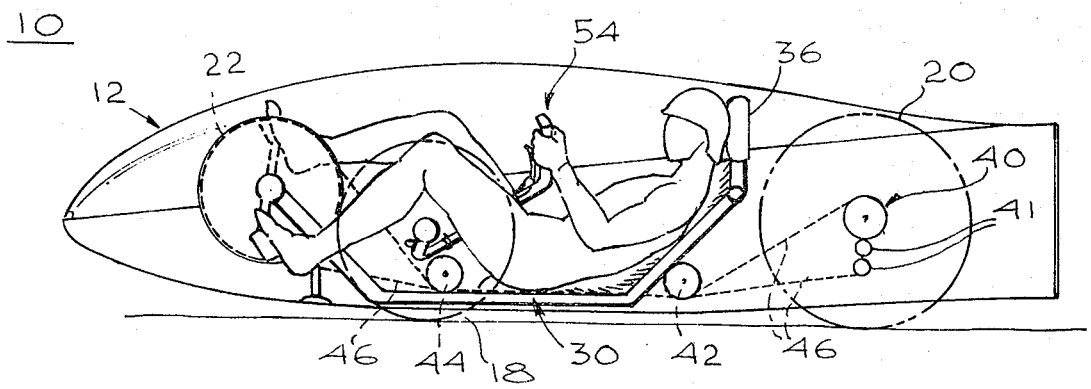
FIG. 3 is a schematic representation of the arrangement of FIG. 1, illustrating the drive mechanisms.
Figure 4:
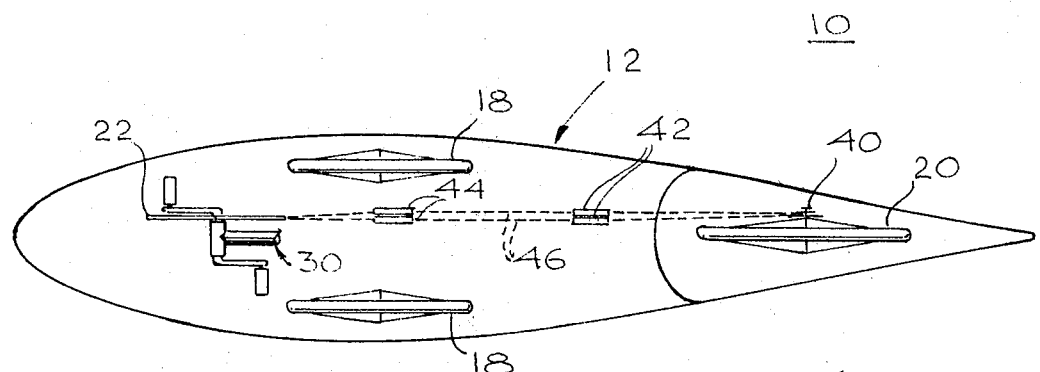
FIG. 4 is a schematic plan view corresponding to FIG. 3.

FIGS. 3 and 4, schematic views of a side elevation and plan, respectively, of the vehicle 10, are presented to show further details of the vehicle drive arrangement. In these views, the chain 46 is shown extending about the drive sprocket 22 and passing rearwardly along the idler or guide pulleys 44, 42 to the derailleur shifting system 40 with its jockey pulleys 41 affixed to the rear tricycle wheel 20. As it passes from the drive sprocket 22 to the gear cluster 40, the chain 46 passes along one pair of idler wheels 42, 44—say the pair to the right of the vehicle 10—which on its return traverse to the drive sprocket 23, it passes along the leftmost pair of idler wheels 42, 44.

Figure 5:
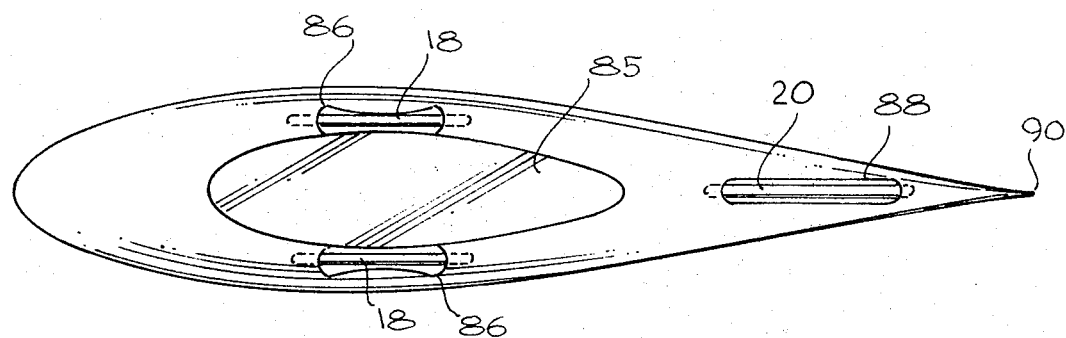
FIG. 5 is a bottom view of the arrangement of FIG. 1.
Figure 6:
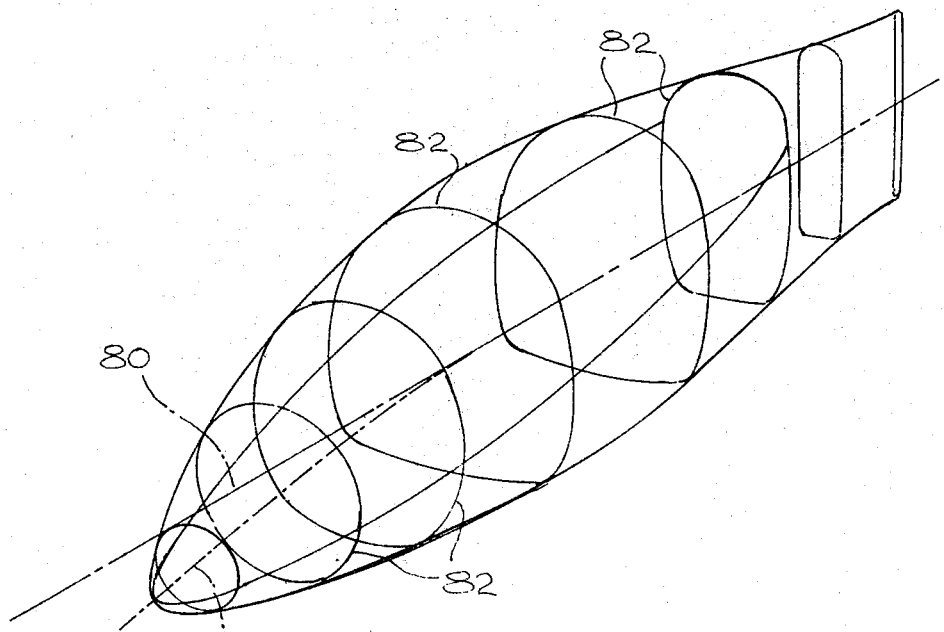
FIG. 6 is a sketch showing various cross sections of the shell of the arrangement of FIG. 1.

Referring now to FIGS. 5 and 6, in which the shape of the streamlined shell is detailed, it will be noted (also see FIG. 1) that the forward portion of the shell resembles a bullet shape with what may be characterized as a drooped nose. In other words, the forward portion of the shell departs from symmetry about a central longitudinal axis represented by the dash line 80. The locus of points constituting the centers of respective transverse sections such as 82 in the forward portion of the shell is represented by the dotted line 84, shown curving downwardly from the longitudinal axis line 80. Along a mid portion of the shell, the circumferential shape departs from symmetry about the central longitudinal axis 80 by virtue of a flat bottom portion 85 generally extending between the front wheels 18 and toward the rear wheel 20. Slots 86 and 88 are provided for the wheels 18, 20, respectively, the forward slots 86 having extended transverse openings at their front and rear to accommodate steering movement of the front wheels 18. As is most apparent in FIGS. 5 and 6, the shell is faired gently inwardly as it progresses from the mid portion to the rear section, accommodating to the narrowness of the internal chassis at the rear wheel 20 and continuing the gentle streamlining to a vertical blade-like termination at the rearward edge 90. This not only accommodates to the streamlining of the shell about the rear wheel 20 but also provides an added element of stabilization at higher operating speeds. The shell is symmetrical about a vertical plane through the central longitudinal axis 80.

The preferred streamlined shape of the shell represents an adaptation of a particular computer-developed symmetrical airfoil. The principal modifications involving the drooped nose and the flattened bottom portion are incorporated to accommodate the ground effects encountered by virtue of operation near the ground surface. Theoretical aspects of the design are developed by considering the shell as though it were reacting in an airstream to a mirror image of itself, with the ground being the plane of the mirror. The shell develops an "underflow" body which allows more ground clearance than a straight sided design of certain particular prior art vehicles. This not only increases roadability without the drag increase associated with a straight-sided design having large road clearance, but also improves the streamlining for air flow under the body.

Good aerodynamic design calls for the fairing of the shell to be widest at a point approximately 30 to 60% of the total length back from the nose. It also calls for the body to be smoothly tapered to a line or point in the rear. The tricycle arrangement of the present vehicle having two front wheels positioned at or near the widest point of the body and one rear wheel in the center at the back produces a natural fit between the theoretically ideal body shape and the chassis. The vehicle has no wheels or other disturbing protrusions in the body forward of the widest point in the shell airfoil, thus avoiding any interference with the natural laminar fluid flow until near a point where the laminar flow of a smooth airfoil naturally transitions to turbulence. The advantageous combination of tricycle chassis and streamlined shell of the present invention is such an improvement over prior art vehicles of the type involved that the initial embodiment of the invention ran more than 10% faster than the previous year's record in its first competition. Furthermore a single seater version of the design set a new record for distance cruising of over 36 miles pedalled in one hour.

Figure 7:
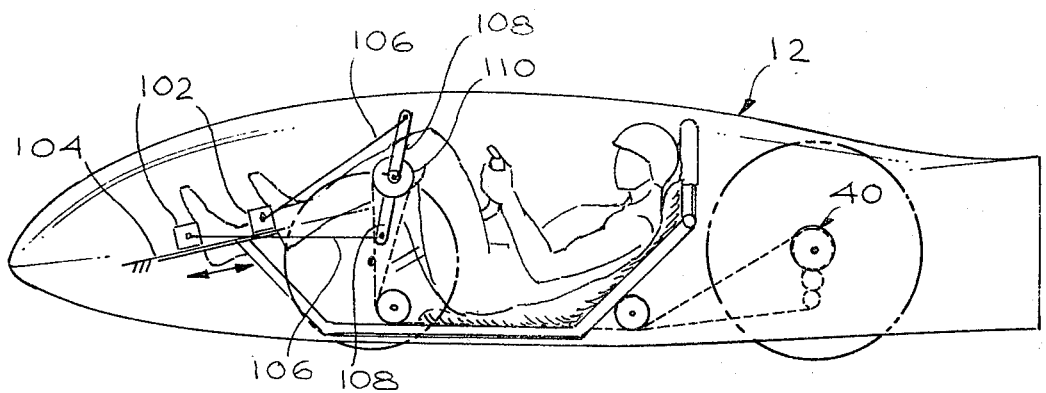
FIG. 7 is a schematic representation showing an alternative drive arrangement for the invention.

Variants of the preferred embodiment depicted in FIGS. 1–4 may include variations in the propulsion mechanism. One such alternative arrangement, shown schematically in FIG. 7, incorporates pedal members 102 adapted to slide along a support surface 104 and coupled via links 106 to pedal cranks 108 on a drive sprocket 110. The remainder of the drive arrangement and chassis is similar to that already described for the principal embodiment. Other forms of linear drives are also possible.

Figure 8:
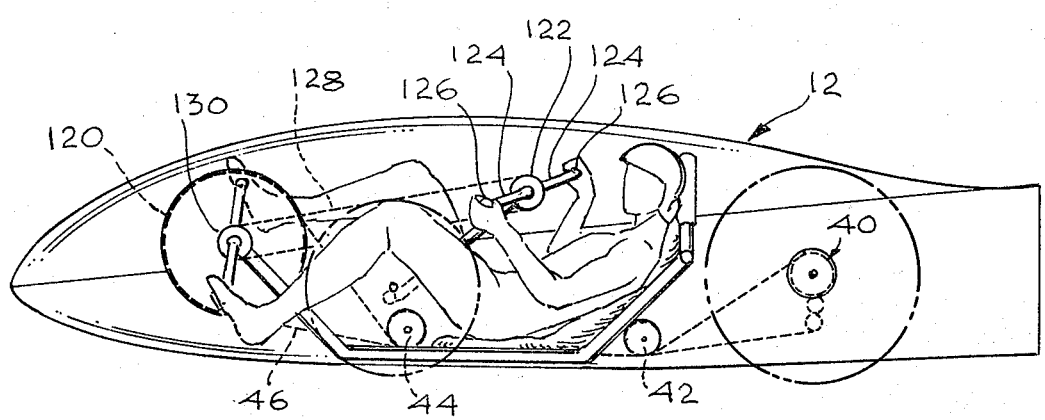
FIG. 8 is a schematic representation showing still another drive arrangement for the invention.

Another alternative arrangement, shown schematically in FIG. 8, incorporates the drive arrangement of the principal embodiment of FIGS. 1–4, but further includes an auxiliary drive mechanism utilizing hand cranking. Thus, FIG. 8 shows a main drive sprocket 120 coupled to the rear drive gear cluster 40 via a chain 46 carried along idler wheels 42, 44 as already described, together with a secondary drive sprocket 122 having pedal cranks 124 and hand grips 126. The secondary drive sprocket 122 is coupled to the main drive sprocket 120 via a secondary drive chain 128 and a coupling sprocket 130 affixed to the main drive sprocket 120. Although not shown in detail, the hand grips 126 will be understood to include mechanism for controlling the vehicle, for example, to effect the braking, shifting and steering of the vehicle. These control mechanisms are coupled to their associated actuating mechanisms via flexible cables (not shown).

Figure 9:
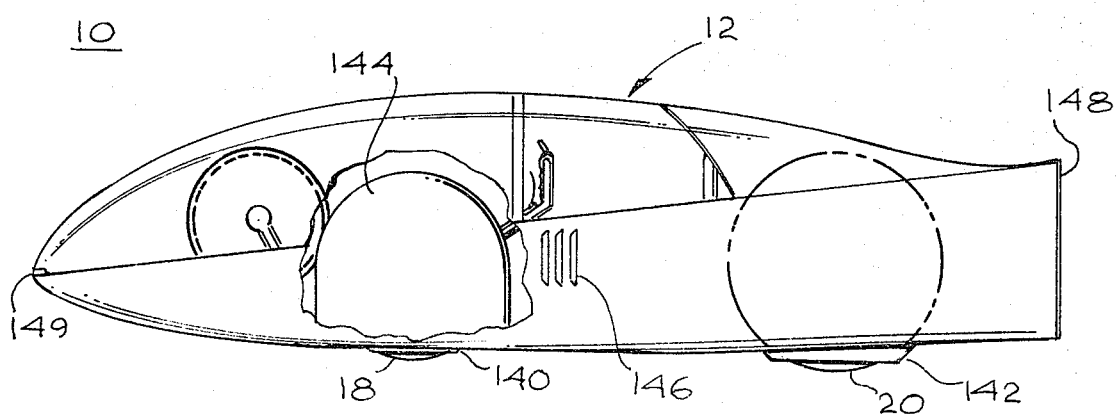
FIG. 9 is a view showing particular features which may be incorporated in accordance with the invention.

Other modifications may be incorporated to improve the safety and comfort of the rider, thus making the vehicle more acceptable as a general human-powered commuter vehicle. For example, FIG. 9 which is a side view of a vehicle 10, partially broken away to show the interior details, shows fairing members 140 and 142 extending downwardly from the lower portion of the body 12 and about the front wheels 18 and rear wheel 20, respectively, to further reduce the aerodynamic drag developed by the wheels. Inside the vehicle 10, enclosures 144 provide wheel wells or fenders, thus both protecting the driver from inadvertently contacting the wheels, and also serving to keep road dirt, water, etc. from being taken up into the rider compartment by the rotating wheels. Thus, vehicles in accordance with the present invention are rendered suitable for travelling in all kinds of weather, the occupant being protected against rain and the like to essentially the same extent as though he were riding in a conventional automobile. Air intakes 146 with internal vent controls may be incorporated to provide selectively variable ventilation to the rider, with inlet air being drawn out the tail via a narrow slot 148. Ventilating air may also be drawn in through an opening 149 (see FIG. 1) at the nose of the vehicle. This position is a stagnation point and thus does not interfere with the laminar air flow around the shell.

Figure 10:
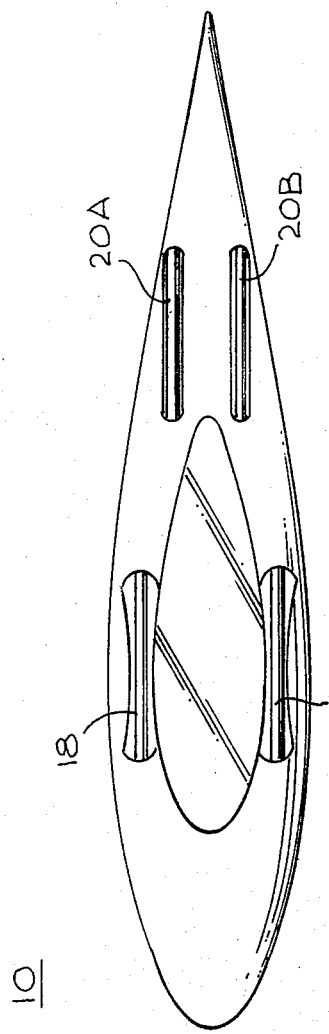
FIG. 10 is a view illustrating an alternative embodiment.

A further alternative arrangement is illustrated by the bottom view of FIG. 10 in which a pair of spaced-apart rear wheels 20A, 20B is substituted for the single rear wheel 20 of FIGS. 1-4. These are principally provided to achieve additional stability for the vehicle and may be moved slightly forward of the position of the wheel 20 in the single-rear-wheel version, partially extending on either side of the occupant position.

Figure 11:
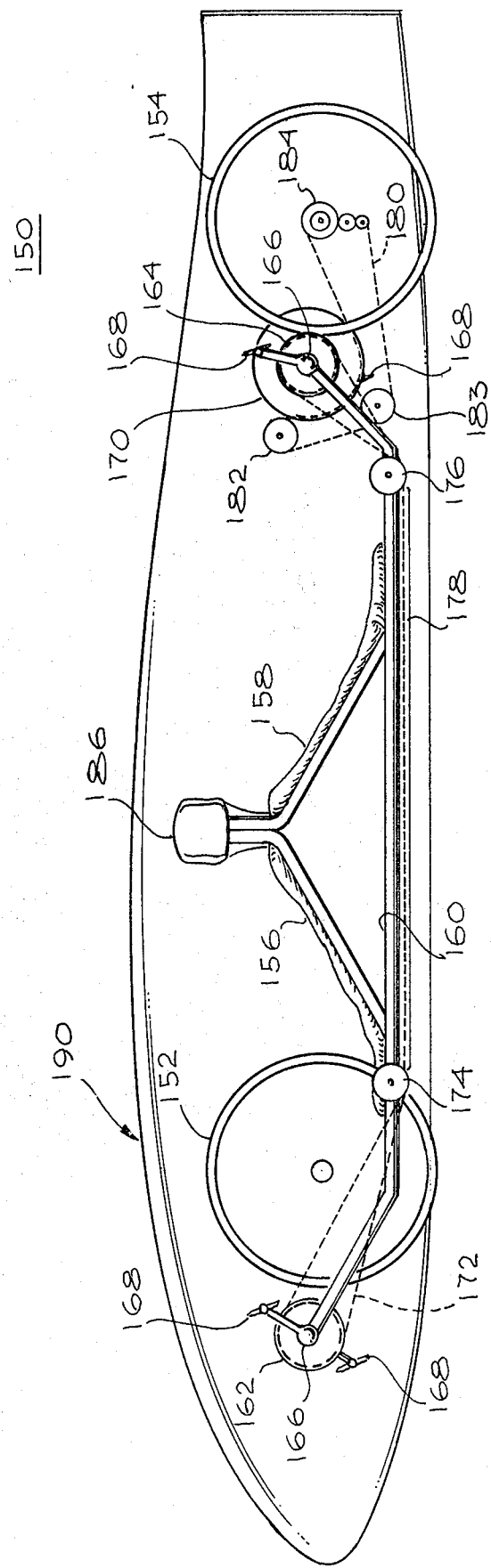
FIG. 11 is a view of still another alternative embodiment of the invention.

FIG. 11 is a schematic view particularly showing details of the drive arrangement and rider positions in a tandem version of the vehicle of the present invention. In FIG. 11, a vehicle 150 is shown set up to accommodate two riders in back-to-back position. The vehicle has a pair of front wheels 152 and a single rear wheel 154. The portion for the forward rider, having a first seat 156, is essentially the same as the corresponding portion shown and described in connection with FIGS. 1-4. A second rider position is shown having seat 158 for positioning the second rider between the first rider and the rear wheel 154. A central longitudinal frame member 160 extends underneath the rider positions to support the respective chain sprockets and, by axle and spindle mounting members, the wheels 152, 154. These mounting members have been omitted from FIG. 11 for simplicity, but correspond to the wheel mounting members shown in FIG. 2. First drive sprockets 162 and 164 are mounted in hubs 166 at the ends of the tubular frame member 160. Pedals 168 are mounted on shafts which rotate within the hubs 166. In the rearward section, a main drive sprocket 170 is affixed to the same shaft as the sprocket 164 and is positioned between the pedals 168, being located to the right side of the rear wheel 154, while the sprocket 164 is located to the left side of the wheel 154.

The sprocket 164 is provided for the purpose of coupling the forward drive sprocket 162 to the main drive sprocket 170. A first drive chain 172 extends between the first drive sprockets 162 and 164, and is threaded in figure-eight fashion about the two sprockets 162, 164. Between these sprockets, it is directed underneath the rider positions and along the frame 160 via respective pairs of side-by-side pulleys 174, 176 and through parallel chain tubes 178. With the chain 172 arranged in this fashion, both riders are able to pedal in conventional fashion; that is, the forward rider pedals to turn the sprocket 162 counterclockwise as shown in FIG. 11, while the rear rider pedals to drive the sprocket 164 in a clockwise direction. Thus the pedalling effort from both riders is effectively applied to turn the main drive sprocket 170 in a clockwise direction. A second drive chain 180 is threaded along the sprocket 170 over only a partial sector at the lower edge thereof, being guided and held in position on the sprocket 170 by means of guide rollers 182, 183. The chain also extends over a conventional derailleur 184 at the rear wheel 154. Thus, rotation of the main drive sprocket 170 in a clockwise direction results in force being applied to drive the rear wheel 154 in a counterclockwise direction. A headrest 186 is positioned centrally to accommodate both riders.

The shell 190 is essentially a stretched version of the shell shown in FIG. 1, and has essentially the same nose and tail portions with an elongated mid-section. Thus the aerodynamic shape in accordance with the present invention is preserved, materially reducing the aerodynamic drag of the vehicle. Such an embodiment of the invention has attained speeds in excess of 60 mph. It is also feasible to provide the second rider position with an auxiliary hand cranking mechanism as shown in FIG. 8, coupled to an additional sprocket mounted alongside the sprocket 164 for additional driver input. All controls are mounted adjacent the forward rider position, with the possible exception of auxiliary braking controls for the rear rider.

There have thus been disclosed herein various embodiments of a human powered vehicle which give promise of satisfying the need for a suitable commuter vehicle which can take the place of the automobile, motorcycle or other motor driven vehicle over reasonable commuting distances. Although pedal-driven and constructed mostly of various parts adapted from the bicycle industry, the vehicle provides safety, comfort, speed and effective range far exceeding the capabilities of the conventional bicycle. The vehicle has demonstrated its superiority over other attempts to develop human powered vehicles capable of supplanting the standard bicycle. When brought into mass production, vehicles of the present invention are expected to penetrate substantially the market for commuter vehicles.

Although there have been described above specific arrangements of a human-powered vehicle in accordance with the invention for the purpose of illustrating the manner in which the invention may be used to advantage, it will be appreciated that the invention is not limited thereto. Additional features may be incorporated as, for example, small auxiliary power sources such as gas engines or electric motors for longer distance cruising, mechanisms, for regenerative braking and energy storage, and the like. Also a mechanism may be included for canting the rear wheel when crosswinds are encountered, thus developing some forward drive from a sail effect. Accordingly, any and all modifications, variations or equivalent arrangements which may occur to those skilled in the art should be considered to be within the scope of the invention as defined in the annexed claims.

What is claimed is:

1. A vehicle capable of being propelled by a human rider comprising:
   a chassis including a seat positioned to support a rider in a generally supine position for operation of the vehicle, at least three wheels including a pair of front wheels in generally coaxial positions on opposite sides and forward of the seat, and drive means coupled to at least one of the wheels to propel the vehicle in response to rider manipulation; and
   a continuous streamlined shell comprising a single lobe totally enclosing the chassis except for slots in the bottom of the shell through which the wheels protrude, said shell having its widest dimension at approximately the position of the front wheels and having an aerodynamically shaped section extending forward of the front wheel axis to terminate in a rounded nose.

2. The vehicle of claim 1 having a single rear wheel mounted centrally behind the seat, and wherein the shell tapers rearwardly from its widest dimension to terminate in a generally vertical blade-shaped edge behind the rear wheel.

3. The vehicle of claim 2 further including a removable canopy constituting a portion of the shell at least partially over the seat, and means for affixing the canopy in position on the remainder of the shell.

4. The vehicle of claim 1 further including a three point suspension structure for releasably attaching the shell to the chassis.

5. The vehicle of claim 1 wherein the forward portion of the shell is generally bullet-shaped with a drooped nose.

6. The vehicle of claim 5 wherein the locus of points constituting the centers of transverse cross-sections of the nose portion of the shell define a curve extending downwardly from the longitudinal axis of the shell.

7. The vehicle of claim 1 wherein the shell is aerodynamically shaped, and the protrusions of the front wheels through slots in the bottom of the shell are located near the point at which air travelling along the shell transitions naturally from laminar to turbulent flow.

8. The vehicle of claim 7 wherein the shell is smooth without any protrusions forward of the point at which air flow transitions naturally from laminar to turbulent flow.

9. The vehicle of claim 1 wherein slots for the front wheels are positioned approximately 30 to 60% of the length of the shell back from the nose.

10. The vehicle of claim 9 wherein the shell includes an underflow body shape having a central flat surface extending underneath the chassis between the front wheels and toward the rear wheel.

11. The vehicle of claim 10 wherein the sides of the shell and the flat surface are faired into each other along matching curved surfaces generally outboard of the flat surface.

12. The vehicle of claim 1 wherein the chassis includes a frame having a principal frame member in the form of a longitudinal tube shaped to curve upwardly behind the seat and having an underslung central portion on which the seat is mounted.

13. The vehicle of claim 12 further including a padded headrest mounted on said upwardly curved portion, and a roll bar in the form of an inverted U-shaped member extending downwardly on opposite sides of the headrest and attached to the frame by a generally horizontal, transverse cross member.

14. The vehicle of claim 13 further including means for releasably mounting the shell to the frame, said means including the transverse cross member and a forward support arm depending downwardly from the longitudinal tube to form a three-point suspension structure.

15. The vehicle of claim 12 wherein the longitudinal tube includes an upwardly extending forward portion, and means for mounting the rider responsive drive means thereon.

16. The vehicle of claim 12 wherein the drive means comprises a main drive sprocket rotatably mounted to the frame and having pedal crank means attached thereto, a variable speed driven sprocket affixed to one of the wheels, and a drive chain means coupling the drive sprocket and the variable speed sprocket.

17. The vehicle of claim 16 wherein the variable speed sprocket is mounted on the rear wheel, and further including a plurality of guide pulleys mounted to the underslung frame for guiding the chain means underneath the seat.

18. The vehicle of claim 12 further including an underslung transverse front axle mounted to the frame forward of the seat and having upwardly extending support members for mounting the hubs of the front wheels on opposite sides of the vehicle.

19. The vehicle of claim 18 further including vehicle control means mounted mounted in front of the seat for access to the rider.

20. The vehicle of claim 19 wherein the control means comprise a joy stick having a support rod extending downwardly toward the front axle, the support rod being pivotably mounted to the frame and having means coupled between the lower end of the support rod and the front wheels for steering the vehicle by pivoting the front wheels.

21. The vehicle of claim 19 wherein the control means include means coupled to the drive means for shifting its drive ratio, and means coupled to a wheel braking mechanism for braking the vehicle.

22. The vehicle of claim 16 wherein the drive means include an auxiliary drive sprocket positioned generally above the seat and having cranks and hand grips for manipulation by a rider's hands to assist the drive applied to the main drive sprocket at the pedal crank means.

23. The vehicle of claim 22 further including an auxiliary drive chain coupling the auxiliary drive sprocket to another sprocket attached to the main drive sprocket.

24. The vehicle of claim 16 wherein the drive means includes slidable pedal means connected to drive the drive sprocket.

25. The vehicle of claim 1 further including means inside the shell for shielding the rider from the wheels.

26. The vehicle of claim 1 further including fairing means extending downwardly from the shell and generally surrounding the wheel portions protruding below the shell.

27. The vehicle of claim 1 wherein the wheels include a pair of rear wheels mounted side by side within a rear portion of the shell.

28. The vehicle of claim 16 further including a second frame member extending rearwardly of the first and having a seat mounted thereon for supporting a second rider in a generally supine position behind the first-mentioned rider position in back-to-back juxtaposition therewith, and wherein the drive means include a second drive sprocket for the second rider mounted to the frame to the rear of the second rider position.

29. The vehicle of claim 28 wherein the drive means include a first drive chain coupling both of the drive sprockets together, a main drive sprocket mounted to rotate with the second drive sprocket, and a second drive chain extending between the main drive sprocket and the variable speed sprocket attached to the rear wheel.

30. The vehicle of claim 29 wherein the first drive chain is threaded in figure-eight fashion about the first and second drive sprockets to permit rotation thereof in opposite directions and further including means for holding the second drive chain in engagement along only a lower sector of the main drive sprocket in order to drive the rear wheel in the same direction of rotation as the first drive sprocket.

31. The vehicle of claim 28 wherein the shell is stretched to enclose the second rider position, the shell having its widest dimension at approximately the position of the front wheels and being faired rearwardly to terminate in a generally vertical, blade-shaped edge behind the rear wheel.

32. A vehicle capable of being propelled by a human rider comprising:
   a frame including a longitudinal frame member;
   a seat positioned on said frame for supporting a rider in a generally supine position;
   a pair of steerable wheels mounted on opposite sides of said frame member forward of said seat;
   at least one rear wheel mounted aft of the seat and coupled to the longitudinal frame member;
   a drive sprocket mounted above the axis of the frame member and forward of said forward steerable wheels and having pedals affixed thereto for rotatably driving the drive sprocket;
   a multi-gear sprocket cluster affixed to the rear wheel;
   a drive chain extending between the drive sprocket and the sprocket cluster;
   a plurality of freewheeling rollers positioned along the frame to guide the chain underneath the seat;
   means for pivoting the steerable wheels to steer the vehicle; and
   a streamlined shell of generally aerodynamic shape totally enclosing the vehicle except for slots in the bottom of the shell through which the wheels protrude.

33. The vehicle of claim 32 wherein the shell has its widest dimension approximately midway between the nose and tail of the shell, the front wheels being located approximately at the widest dimension.

34. The vehicle of claim 33 wherein the shell includes a generally bullet-shaped forward portion with a drooped nose extending forwardly of the axis of the front wheels.

35. The vehicle of claim 34 wherein the portion of the shell forward of the front wheel slots is devoid of any protrusions or other elements which might interfere with laminar air flow along the shell.

36. The vehicle of claim 35 wherein the shell tapers rearwardly of its widest dimension to terminate in a generally vertical, blade-shaped edge at the rear.

37. The vehicle of claim 36 wherein the rear wheel is centrally mounted within a narrow portion of the shell adjacent the blade-shaped edge.

* * * * *